Sept. 10, 1963   G. C. STONE ET AL   3,103,379
ROAD VEHICLE BODY STRUCTURE
Filed Feb. 10, 1961   3 Sheets-Sheet 3
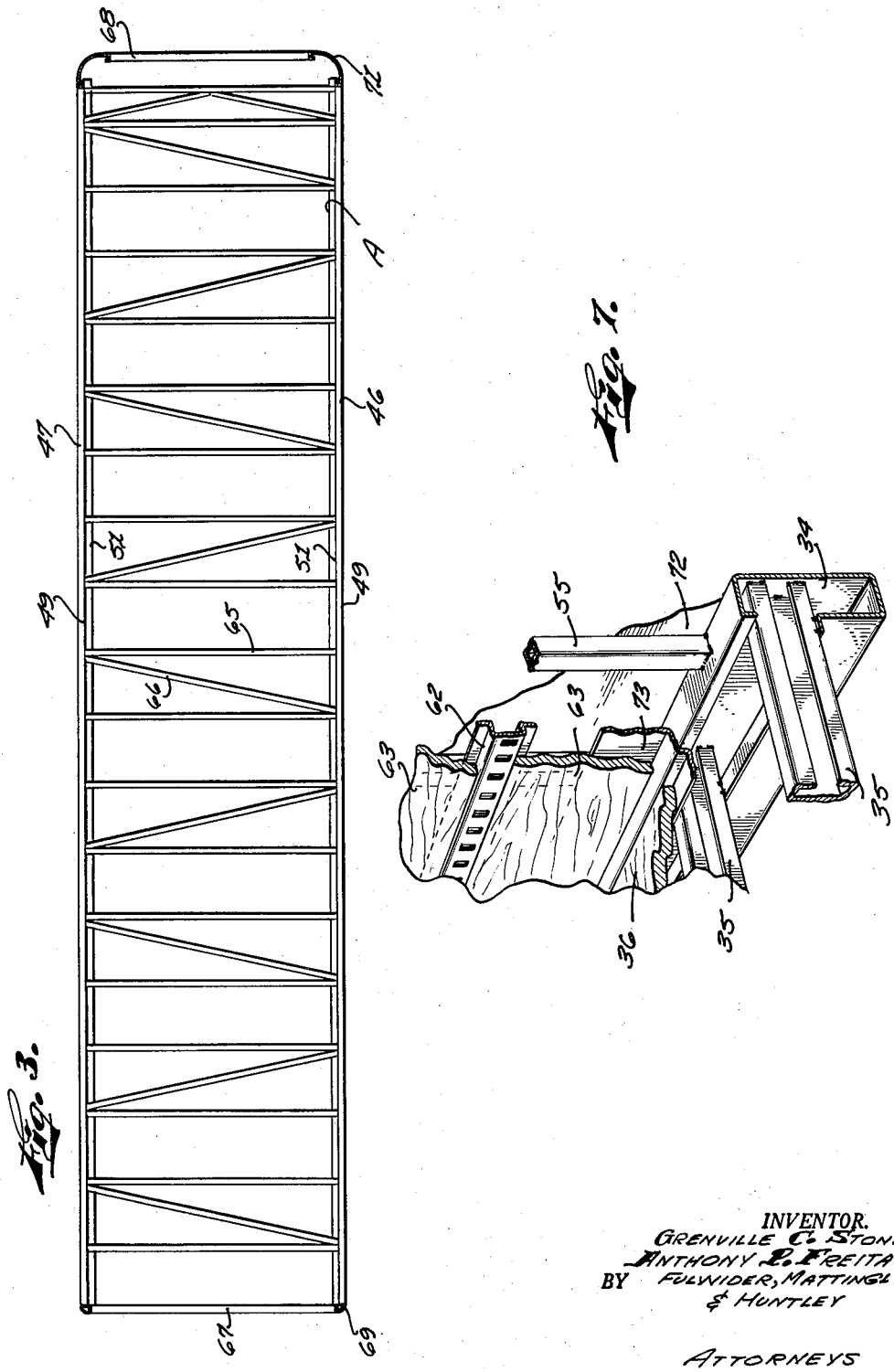
INVENTOR.
GRENVILLE C. STONE
ANTHONY L. FREITAS
BY FULWIDER, MATTINGLY
& HUNTLEY
ATTORNEYS United States Patent Office 3,103,379
Patented Sept. 10, 1963

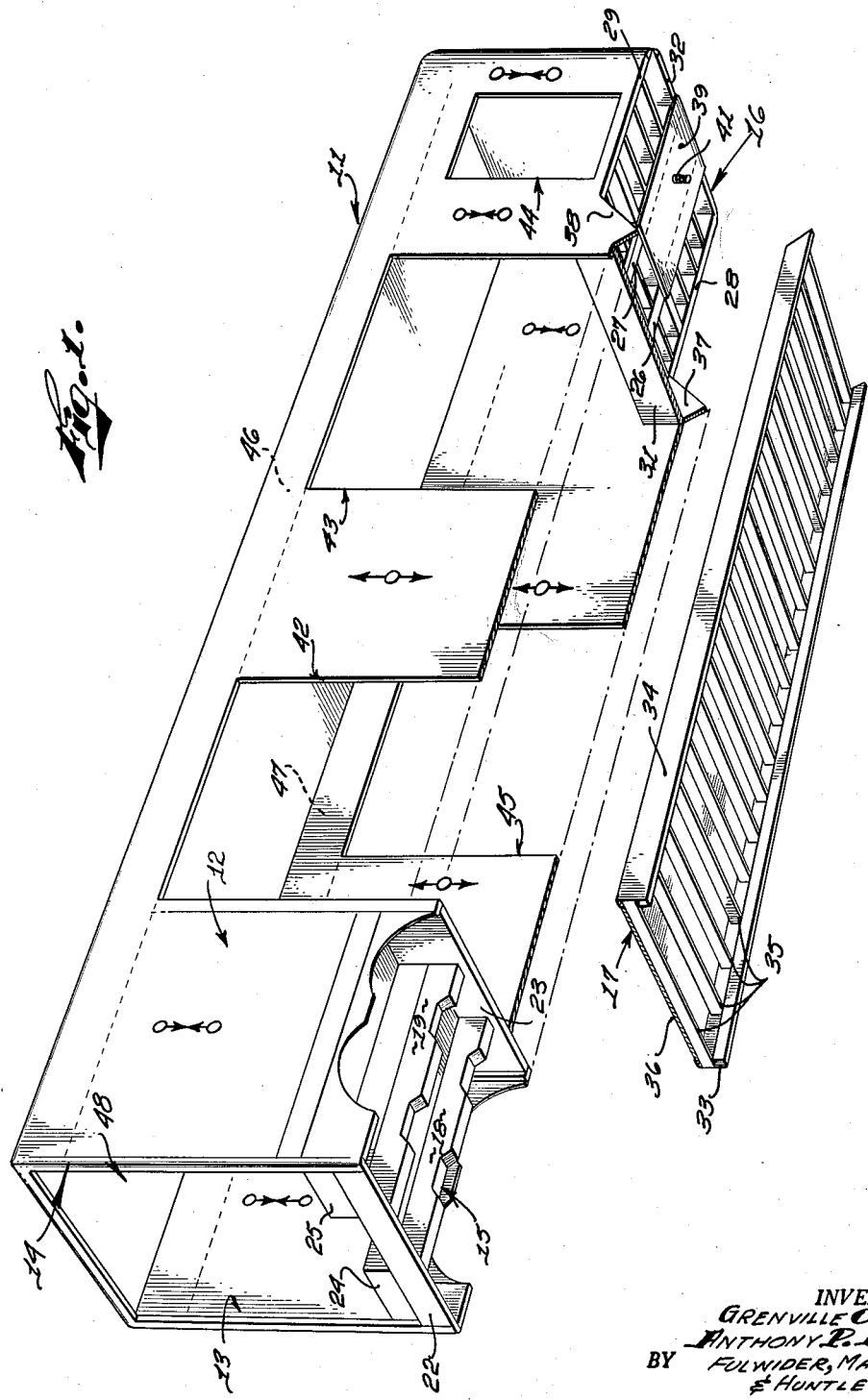

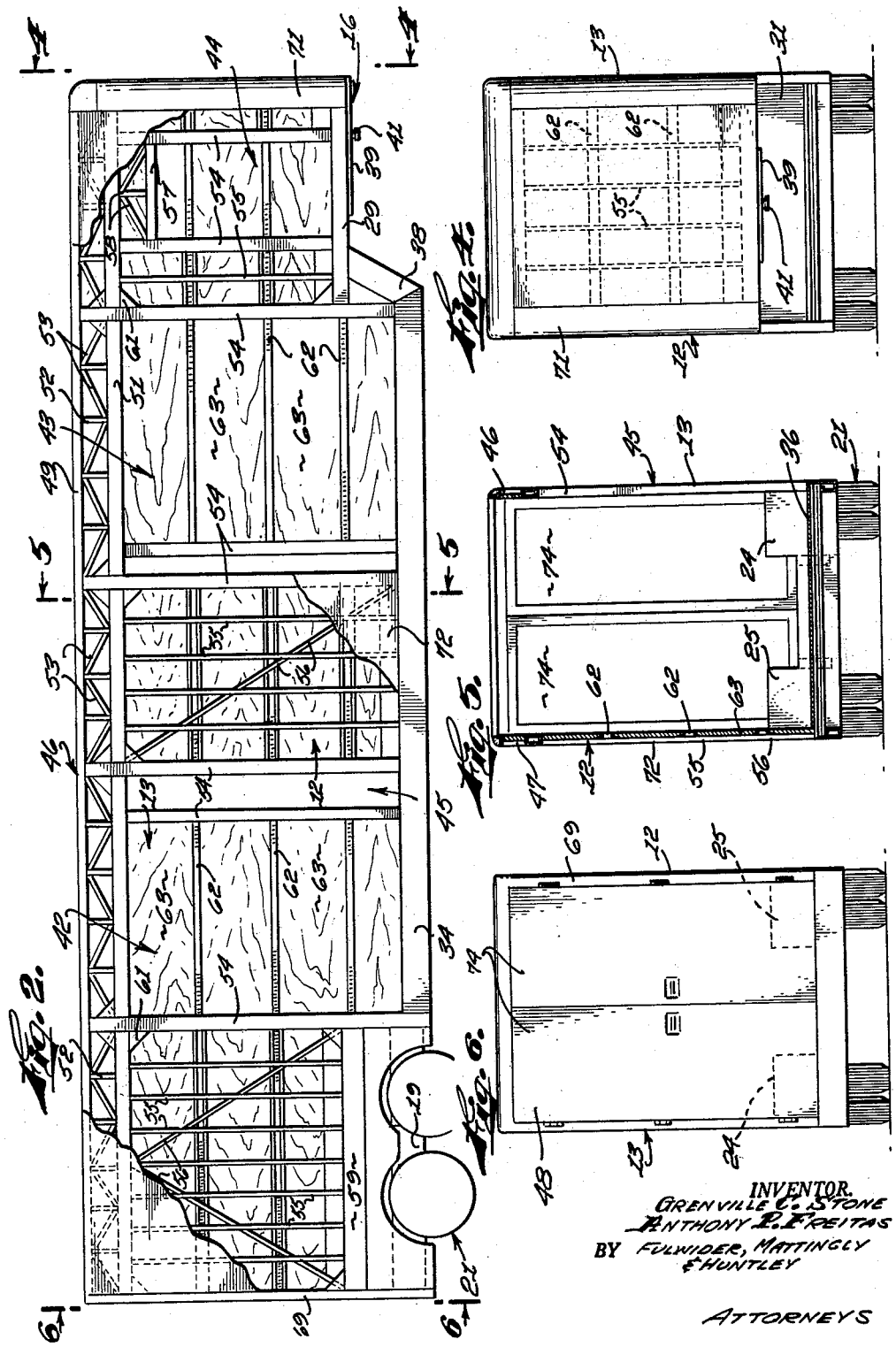

3,103,379
ROAD VEHICLE BODY STRUCTURE
Grenville C. Stone, Compton, and Anthony P. Freitas, Southgate, Calif. (both of 18033 S. Santa Fe Ave., Long Beach 7, Calif.)
Filed Feb. 10, 1961, Ser. No. 88,435
7 Claims. (Cl. 296—28)

This invention relates to a road vehicle such as a trailer van for highway transportation of cargo.

An object of the present invention is the provision of a road vehicle such as a trailer van having large access ports through the side walls of the van and a relatively rigid construction having a minimum floor deflection under load.

Another object of this invention is the provision of a road vehicle such as a trailer van having a maximum of access port opening thereinto without impairing the rigidity of the vehicle construction and while providing for a minimum floor deflection under load.

Another object of this invention is the provision of a road vehicle such as a trailer van in which the vehicle floor is supported not only by load pads adjacent the ends of the vehicle but is also suspended at the sides of the vehicle between the end supports from overhead truss beams or girders.

A further object of this invention is the provision of a road vehicle such as a trailer van having minimum floor deflection under load.

A still further object of the present invention is the provision of a road vehicle such as a trailer van supported adjacent to the opposite ends thereof and having overhead truss beams from which the vehicle floor intermediate the end supporting points is suspended, with a pair of large curb-side access ports intermediate said supporting points and having floor suspending elements in tension in the side wall between the access ports, and a single large road-side access port located substantially centrally between said supporting points and having floor suspending elements in tension in the side wall opposite sides of said road-side access port.

These and other objects and features of this invention will be readily apparent to those skilled in the art from the following specification of a presently preferred embodiment of the invention and the appended drawings thereof in which:

FIGURE 1 is a diagrammatic illustration of a road vehicle body according to the present invention, illustrating the large access port area and the cargo floor suspension;

FIGURE 2 is a side elevational view of a road vehicle according to the present invention with the outer skin broken away to show an upper, side truss beam or girder and the side wall construction;

FIGURE 3 is a top plan view of the vehicle superstructure with the roof covering removed;

FIGURE 4 is a front elevational view from the plane 4—4 of FIGURE 2;

FIGURE 5 is a transverse vertical sectional view on the line 5—5 of FIGURE 2;

FIGURE 6 is a rear elevational view from the plane 6—6 of FIGURE 2; and

FIGURE 7 is an enlarged detailed sectional and broken away view, in perspective, of the side wall and floor construction.

FIGURE 1 of the drawing is a diagrammatic representation of the body of the road vehicle or trailer van of this invention showing the access ports and the suspension of the cargo floor from the truss beams or girders disposed at the top of the opposite side walls of the body. The body of the road vehicle or trailer van is indicated generally at 11 and comprises a curb side wall 12, a road side wall 13 and a roof 14. The bottom of the vehicle body includes a rear load supporting pad 15, a forward load supporting pad 16 and an intermediate main cargo floor 17 therebetween. The rear load pad 15 includes a pair of transversely spaced, longitudinally extending supporting rails 18 and 19 adapted to be supported on a tandem axle assembly indicated generally at 21 in FIGURE 2. The supporting rails 18 and 19 are joined at their opposite ends by cross frames 22 and 23 and wheel wells are provided by the box-like structures 24 and 25 extending into the interior of the vehicle body 11 at the rear thereof. The front load pad 16 includes intermediate longitudinally extending supporting rails 26 and 27 and side rails 28 and 29 connected at their opposite ends by cross frames 31 and 32.

The main cargo floor is made up of side rub rails 33 and 34, between which extend transverse floor joists 35, welded or otherwise secured at their opposite ends to the side rails. On top of the joists 35 is laid the floor proper 36 of wood or other desired material. The rear ends of the side rails 33 and 34 are welded or otherwise rigidly secured in supporting relation to the cross frame 23. The forward ends of the rub rails 33 and 34 are connected through rub rail extensions 37 and 38 to the front load pad side rails 28 and 29. The side rails 33 and 34 of the main cargo floor 17 are also rigidly secured to the curb and road side walls 12 and 13 of the body 11, as will be explained more in detail hereinafter in connection with the showing of FIGURES 2 and 7. At the front load pad 16 a bearing plate 39 is rigidly connected between the supporting rails 26 and 27 and in turn supports a king bolt or coupling pin 41 adapted to be engaged by a complementary coupling member on the tractor, not shown, which tows the trailer van.

The curb side wall 12 of the vehicle body is provided with two large access ports 42 and 43, and with a smaller forward access port 44 above the front load pad 16. The road side wall 13 of the vehicle body is provided with a single large access port 45 offset forwardly of the access port 42 and rearwardly of the access port 43. The rear of the vehicle body is entirely open to supply a large access port 48 thereat.

Extending along the top edges of the side walls 12 and 13 of the body 11 are truss beams or girders 46 and 47, respectively, from which the main cargo floor of the vehicle is suspended through the side walls 12 and 13. The nature of the forces in the side walls of the body 11 is shown in FIGURE 1 to illustrate the manner in which the main cargo floor is supported. It will be apparent from the previous description that the main cargo floor is directly supported at its opposite ends on the load pads 15 and 16. Intermediate the load pad supports, the floor is supported from the upper truss beams 46 and 47 through the body side walls 12 and 13 and the resulting forces are indicated in FIGURE 1. Above the load pads 15 and 16, the side walls 12 and 13 are shown to be in compression to support the truss beams 46 and 47 and intermediate the load pads the side walls are shown to be in tension to support the cargo floor from the truss beams. These tension forces are exerted at opposite sides of the road-side access port 45 and intermediate the curb side access ports 42 and 43. Thus, the tension forces supporting the intermediate portion of the cargo floor are transmitted to the longitudinally extending upper truss beams 46 and 47 and through the opposite ends of the body side walls, in compression, to the loading pads.

The actual mechanical structure of certain of the elements shown in FIGURE 1 is illustrated more clearly in FIGURES 2 and 7. Thus, the truss beam 46 in FIGURE 2 is shown as made up of a pair of vertically spaced, longitudinally extending beams 49 and 51 between which are rigidly secured vertical truss braces 52 and slanted trusses 53 extending therebetween. The access ports described in connection with FIGURE 1 are framed by heavy vertical members 54 extending between the truss beams 46—47 and the rub rails 33—34 and side rails 28—29. Between the vertical members 54, the truss beams 46—47 are connected to the rub rails 34—33, respectively, by tubular vertical members 55 welded at their opposite ends to the bottom surfaces of the beams 51 and the upper surfaces of the rub rails 33—34. To further rigidify the structure, slanted braces 56 are disposed between the vertical members 55.

As shown at the right hand side of FIGURE 2 above the forward load pad 16, the vertical members 54 extend between the beam 51 and the side rails 28 and 29, and the vertical members 55 are similarly disposed. Additional strengthening members at this point are provided in the longitudinally extending rail 57 and the bracing trusses 58. In the rear portions of the side walls 12 and 13 the vertical members 55 extend between the beams 51 and side rails 59 which are connected between the cross frames 22 and 23. Gusset plates such as at 61 may be disposed as desired to strengthen the frame structure.

Vertically spaced tie-off rails 62 are welded or otherwise secured to the vertical members 54—55 of the side walls 12 and 13, as shown in FIGURES 2, 5 and 7. These tie-off rails extend longitudinally of the vehicle body and provide ready means for tying down the cargo transported within the vehicle body. Wall boards 63 supply the inside walls of the vehicle body between the tie-off rails 62, and between the tie-off rails and the top and bottom of the body.

A plan view of the top of the vehicle with roof covering removed is shown in FIGURE 3 wherein the opposite beams 49 are connected in spaced relation by transverse braces 65 and the slanted braces 66. Opposite end transverse members are indicated at 67 and 68, with suitable corner members at 69 and 71.

The exterior surface of the body is provided by thin sheet metal walls 72 connected to the vertical members 54 and 55 and to the top and bottom of the vehicle body, and a suitable roofing material is mounted over the braces 65 and 66. A rub rail cap member 73 is disposed at each side of the vehicle and is overlapped by the bottom wall boards 63 and the floor 36.

The access ports are closed by any desired type of door; for example, the double swinging doors 74 shown in FIGURE 6 as closing the rear access port 48.

While a certain presently preferred embodiment of the invention has been specifically illustrated and described it will be understood the invention is not limited thereto as many variations therein will be readily apparent to those skilled in the art and the invention is to be given its broadest interpretation within the terms of the following claims.

We claim:
1. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; a pair of longitudinally spaced, large access ports in the curb side wall of said body across which no supporting members extend, said access ports being located respectively adjacent to the front and rear supporting pads and there being side wall vertical supporting members between said access ports; and a large access port in the road side wall of said body across which no supporting members extend, said road side access port being offset longitudinally from both said curb side wall access ports so as to be positioned across from the side wall vertical supporting members between said curb side access ports; the supporting members above said supporting pads being substantially in compression from the force exerted thereon by said truss beams and the supporting members intermediate said supporting pads being substantially in tension by the force exerted thereon by the main cargo supporting floor.

2. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; a pair of longitudinally spaced, large access ports in the curb side wall of said body across which no supporting members extend, said access ports being located respectively adjacent to the front and rear supporting pads and there being side wall vertical supporting members between said access ports; and a large access port in the road side wall of said body across which no supporting members extend, said road side access port being offset longitudinally from both said curb side wall access ports and so as to be positioned across from the side wall vertical supporting members between said curb side access ports; the supporting members above said supporting pads being substantially in compression from the force exerted thereon by said truss beams and the supporting members between said curb side access ports and at opposite sides of said road side access port being substantially in tension by the force exerted thereon by the main cargo supporting floor, whereby said floor is supported at its ends directly by said supporting pads and intermediate said pads is suspended from said truss beams.

3. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; a pair of longitudinally spaced, large access ports in the curb side wall of said body across which no supporting members extend, said access ports being located respectively adjacent to the front and rear supporting pads and there being side wall vertical supporting members between said access ports; and a large access port in the road side wall of said body across which no supporting members extend, said road side access port being offset longitudinally from both said curb side wall access ports so as to be positioned across from the side wall vertical supporting members between said curb side access ports; the supporting members above said supporting pads being substantially in compression from the force exerted thereon by said truss beams and the supporting members intermediate said supporting pads being substantially in tension by the force exerted thereon by the main cargo supporting floor; an additional access port in a side wall of said body above said front supporting pad; and an access port in the rear of said body between the side walls thereof.

4. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; a pair of longitudinally spaced, large access ports in the curb side wall of said body across which no supporting members extend, said access ports being located respectively adjacent to the front and rear supporting pads and there being side wall vertical supporting members between said access ports; a large access port in the road side wall of said body across which no supporting members extend, said road side access port being offset longitudinally from both said curb side access ports so as to be positioned across from the side wall vertical supporting members between said curb side access ports; the supporting members above said supporting pads being substantially in compression from the force exerted thereon by said truss beams and the supporting members between said curb side access ports and at opposite sides of said road side access port being substantially in tension by the force exerted thereon by the main cargo supporting floor, whereby said floor is supported at its ends directly by said supporting pads and intermediate said pads is suspended from said truss beams; an additional access port in a side wall of said body above said front supporting pad; and an access port in the rear of said body between the side walls thereof.

5. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; vertically spaced, longitudinally extending tie-off rails mounted on the inner surfaces of said side wall vertical supporting members; inner wall boards mounted on said vertical supporting members between said tie-off rails, the vertical supporting members above said supporting pads being substantially in compression from the force exerted thereon by said truss beams and the supporting members intermediate said supporting pads being substantially in tension by the force exerted thereon by the main cargo supporting floor, whereby said floor is supported at its opposite ends directly from said supporting pads and is suspended intermediate the supporting pads from said truss beams; a pair of large access ports in the curb side wall of said body across which no supporting members extend, said access ports being located respectively adjacent to the front and rear load supporting pads and with side wall vertical supporting members in the side wall therebetween; and a large access port in the road side wall of said body offset longitudinally from each of said curb side access ports so as to be located at substantially a mid point between said front and rear supporting pads, whereby said tensioned vertical supporting members are located between the access ports in the curb side wall of the body and at opposite sides of the access port in the road side wall of the body.

6. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; vertically spaced, longitudinally extending tie-off rails mounted on the inner surfaces of said side wall vertical supporting members; inner wall boards mounted on said vertical supporting members between said tie-off rails, the vertical supporting members above said supporting pads being substantially in compression from the force exerted thereon by said truss beams and the supporting members intermediate said supporting pads being substantially in tension by the force exerted thereon by the main cargo supporting floor, whereby said floor is supported at its opposite ends directly from said supporting pads and is suspended intermediate the supporting pads from said truss beams; a pair of large access ports in the curb side wall of said body across which no supporting members extend, said access ports being located respectively adjacent to the front and rear load supporting pads and with side wall vertical supporting members in the side wall therebetween; a large access port in the road side wall of said body offset longitudinally from each of said curb side access ports so as to be located at substantially a mid point between said front and rear supporting pads whereby said tensioned vertical supporting members are located between the access ports in the curb side wall of the body and at opposite sides of the access port in the road side wall of the body; and an access port in a side wall of said body immediately above said front supporting pad so that the vertical members at opposite sides of said front access port are substantially in compression.

7. A road vehicle body comprising: front and rear load supporting pads at the bottom of said body; a main cargo supporting floor having its ends directly supported by said pads; a truss beam longitudinally disposed at the top of each side of said body; side wall vertical supporting members between said truss beams and said floor and between said truss beams and said pads; a pair of longitudinally spaced, large access ports in the curb side wall of said body across which no supporting members extend, said access ports being located respectively adjacent to the front and rear supporting pads and there being side wall vertical supporting members between said access ports; a large access port in the road side wall of said body across which no supporting members extend, said road side access port being offset longitudinally from both said curb side wall access ports and so as to be positioned across from the side wall vertical supporting members between said curb side access ports; the supporting members above said supporting pads being substantially in compression from the force exerted thereon by said truss beams and the supporting members intermediate said supporting pads being substantially in tension from the force exerted thereon by the main cargo supporting floor; an additional access port in a side wall of said body above said front supporting pad; an access port in the rear of said body between the side walls thereof; and transverse braces extending across the top of said body between said truss beams to complete the body frame and supply a roof support.

References Cited in the file of this patent

UNITED STATES PATENTS

| | | |
|---|---|---|
| 347,553 | Batchelor | Aug. 17, 1886 |
| 401,529 | Zurcher | Apr. 16, 1889 |
| 459,896 | Macmillan | Sept. 22, 1891 |
| 1,108,634 | Spangler | Aug. 25, 1914 |
| 1,943,472 | Frazer | Jan. 16, 1934 |
| 2,608,420 | Eck | Aug. 26, 1952 |
| 2,803,200 | Johnsen | Aug. 30, 1957 |
| 2,919,663 | Neuhart | Jan. 5, 1960 |

FOREIGN PATENTS

| | | |
|---|---|---|
| 884,981 | France | May 17, 1943 |